(12) United States Patent
Pursifull

(10) Patent No.: US 8,001,782 B2
(45) Date of Patent: Aug. 23, 2011

(54) APPROACH FOR IDENTIFYING AND RESPONDING TO AN UNRESPONSIVE WASTEGATE IN A TWIN TURBOCHARGED ENGINE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 876 days.

(21) Appl. No.: 11/862,001

(22) Filed: Sep. 26, 2007

(65) Prior Publication Data
US 2009/0077965 A1 Mar. 26, 2009

(51) Int. Cl.
*F02B 33/44* (2006.01)
*F02B 33/00* (2006.01)
*G06F 7/00* (2006.01)
*G06F 17/00* (2006.01)

(52) U.S. Cl. .............. 60/612; 60/602; 701/103; 123/562

(58) Field of Classification Search .................... 60/612, 60/602–603; 701/103; 123/562, 198 F
See application file for complete search history.

(56) References Cited

U.S. PATENT DOCUMENTS

| | | | | |
|---|---|---|---|---|
| 4,781,027 A * | 11/1988 | Richter et al. | ................... | 60/612 |
| 5,003,781 A * | 4/1991 | Shibata et al. | ................... | 60/612 |
| 5,186,005 A * | 2/1993 | Yoshioka et al. | ............... | 60/612 |
| 5,447,031 A | 9/1995 | Betts et al. | ....................... | 60/603 |
| 5,845,495 A | 12/1998 | Schray et al. | ................... | 60/612 |
| 6,050,250 A | 4/2000 | Kerkau | ........................... | 60/602 |
| 6,112,523 A * | 9/2000 | Kamo et al. | ..................... | 60/612 |
| 6,202,415 B1 * | 3/2001 | Lohmann et al. | ............... | 60/612 |
| 6,253,551 B1 * | 7/2001 | Lohmann et al. | ............... | 60/612 |
| 6,338,250 B1 | 1/2002 | Mackay | ........................... | 60/612 |
| 6,432,287 B1 | 8/2002 | McMackin et al. | ........... | 204/424 |
| 6,571,602 B2 | 6/2003 | Ohkuma | ....................... | 73/118.1 |
| 6,691,507 B1 | 2/2004 | Meyer et al. | .................... | 60/285 |

(Continued)

FOREIGN PATENT DOCUMENTS

EP 1557549 1/2005

(Continued)

OTHER PUBLICATIONS

Disclosed Anonymously, "Exhaust Temperature Measurement Using UEGO Temperature Feedback", Research Disclosure Journal, published Feb. 2006, Database No. 502075.

*Primary Examiner* — Thai Ba Trieu
(74) *Attorney, Agent, or Firm* — Allan J. Lippa; Alleman Hall McCoy Russell & Tuttle LLP

(57) ABSTRACT

An engine system for a vehicle is provided, comprising an internal combustion engine including an exhaust system; a first turbine including a first wastegate and arranged along a first branch of the exhaust system, a second turbine including a second wastegate and arranged along a second branch of the exhaust system; a first exhaust gas sensor arranged along the first branch of the exhaust system downstream of the first turbine and first wastegate; a second exhaust gas sensor arranged along the second branch of the exhaust system downstream of the second turbine and the second wastegate; and a control system configured to command the first and second wastegates to a closed or open position and to indicate one of said wastegates as unresponsive to said command in response to a temperature difference between the first and second branches indicated by the first and second exhaust gas sensors.

13 Claims, 7 Drawing Sheets

U.S. PATENT DOCUMENTS

| | | | |
|---|---|---|---|
| 6,715,289 B2 * | 4/2004 | Mader et al. | 60/612 |
| 6,917,873 B2 * | 7/2005 | Itoyama | 123/562 |
| 7,066,157 B2 * | 6/2006 | Takahashi et al. | 60/612 |
| 7,076,955 B2 * | 7/2006 | Herz et al. | 60/612 |
| 7,305,828 B2 * | 12/2007 | Todoroki et al. | 60/612 |
| 7,360,356 B2 * | 4/2008 | Narita et al. | 123/198 F |
| 7,380,401 B2 * | 6/2008 | Henn et al. | 60/612 |
| 7,540,151 B2 * | 6/2009 | Boehm et al. | 60/612 |
| 7,665,297 B2 * | 2/2010 | Suzuki et al. | 123/198 F |
| 7,770,393 B2 * | 8/2010 | Buckland et al. | 60/612 |
| 2006/0117751 A1 | 6/2006 | Todoroki et al. | 60/612 |
| 2009/0013945 A1 * | 1/2009 | Buckland et al. | 60/612 |
| 2009/0018751 A1 * | 1/2009 | Buckland et al. | 701/103 |
| 2009/0064677 A1 * | 3/2009 | Farmer | 60/612 |
| 2009/0107140 A1 * | 4/2009 | Pursifull | 60/612 |
| 2009/0183507 A1 * | 7/2009 | Weaver et al. | 60/602 |

FOREIGN PATENT DOCUMENTS

| | | | |
|---|---|---|---|
| JP | 03275949 A | * | 12/1991 |
| JP | 05005420 A | * | 1/1993 |

* cited by examiner

|  | LOWER TEMPERATURE EXHAUST STREAM | HIGHER TEMPERATURE EXHAUST STREAM |
|---|---|---|
| WASTEGATES COMMANDED OPEN | WASTEGATE IS UNRESPONSIVE TO COMMAND AND HAS REMAINED CLOSED | WASTEGATE HAS OPENED RESPONSIVE TO COMMAND |
| WASTEGATES COMMANDED CLOSED | WASTEGATE HAS CLOSED RESPONSIVE TO COMMAND | WASTEGATE IS UNRESPONSIVE TO COMMAND AND HAS REMAINED OPEN |

FIG. 5

APPROACH FOR IDENTIFYING AND RESPONDING TO AN UNRESPONSIVE WASTEGATE IN A TWIN TURBOCHARGED ENGINE

BACKGROUND AND SUMMARY

Turbochargers for internal combustion engines can include a wastegate for controlling the portion of the exhaust stream that is directed through the exhaust gas turbine stage of the turbocharger. By varying the position of the wastegate, the level of boost provided by the compressor stage of the turbocharger can be increased or decreased accordingly. Engines including twin turbochargers can utilize wastegate control to balance the level of boost provided by each of the turbochargers.

Under some conditions, turbocharger imbalance can occur when a wastegate associated with one of the turbochargers is set to a different position than the wastegate of the other turbocharger or where one of the compressors enters a surge condition. For example, high engine temperatures and various particulates in the exhaust gas can cause a wastegate to become inoperable, rendering it unresponsive to subsequent commands. When both of the wastegates are concurrently commanded to a set position, the unresponsive wastegate can initiate an oscillating imbalance between the turbochargers, which can degrade the engine or turbochargers.

The inventor herein has recognized that intake systems that utilize a combined intake manifold communicating with twin compressors stages arranged in parallel can pose additional challenges for purposes of management of turbocharger imbalance and wastegate operability. For example, it may be difficult to distinguish the separate flow characteristics of each compressor via a sensor provided at the combined flow. However, use of additional sensors for detecting the position or operability of the wastegates or the separate flow characteristics each turbocharger can provide erroneous feedback if the additional sensors become degraded.

The inventor herein has also recognized that exhaust gas sensors are already utilized in some engine systems to provide air/fuel feedback control to the engine. For example, universal exhaust gas oxygen (UEGO) sensors can be positioned just downstream of each of the turbocharger's exhaust turbine and wastegate passages. While these exhaust gas sensors can be used to measure exhaust gas composition, a compressor side imbalance has very little effect on exhaust gas composition. Instead, the loading on the turbines may be altered between banks as a single compressor goes into surge. The turbocharger having the surging compressor can manifest this surge by an unloading of its turbine and the load on the other turbine can increase proportionally as the non-surging compressor supplements the airflow to the engine. This results in an exhaust temperature difference between the exhaust streams. Thus, in some conditions, the exhaust gas sensors can be used as exhaust temperature sensors, whereby the difference between the temperatures of the exhaust streams can be used as an indication of turbocharger imbalance and compressor surge, enabling mitigating action to be taken to reduce the imbalance. Additionally, wastegate functionality can be diagnosed by examining temperature changes of the exhaust streams after a control command has been issued to the wastegates.

Therefore, as one example, the above issues can be addressed by an engine system for a vehicle, comprising: an internal combustion engine including an air intake system and an exhaust system; a first turbocharger including a first compressor arranged along a first branch of the air intake system, a first turbine arranged along a first branch of the exhaust system, and a first turbine bypass passage include a first wastegate; a second turbocharger including a second compressor arranged along a second branch of the air intake system, a second turbine arranged along a second branch of the exhaust system, and a second turbine bypass passage including a second wastegate; a first exhaust gas sensor arranged along the first branch of the exhaust system downstream of the first turbine and first wastegate; a second exhaust gas sensor arranged along the second branch of the exhaust system downstream of the second turbine and the second wastegate; and a control system configured to command both the first wastegate and the second wastegate to a closed position or an opened position and to indicate one of said wastegates as unresponsive to said command in response to a temperature difference between the first and second branches indicated by the first and second exhaust gas sensors.

In this way, wastegate operability and turbocharger imbalance can be identified via a group of sensors that are already provided with the engine for purposes of air/fuel feedback control and mitigating action can be taken to reduce the imbalance, thereby reducing compressor surge.

As another example, a method of operating an engine system is provided, including an engine having a first cylinder bank and a second cylinder bank operatively coupled to at least two turbochargers via a common intake manifold. The method comprises: during a first mode, varying an amount of fuel that is provided to the first cylinder bank responsive to feedback provided by a first exhaust gas sensor arranged along an exhaust passage of the first cylinder bank and varying an amount of fuel that is provided to the second cylinder bank responsive to feedback provided by a second exhaust gas sensor arranged along an exhaust passage of the second cylinder bank; and during a second mode, adjusting an operating parameter of at least one of the turbochargers responsive to a comparison of a first temperature indication provided by the first exhaust gas sensor and a second temperature indication provided by the second exhaust gas sensor.

In this way, an operating parameter, such as turbine geometry, wastegate position, compressor bypass, etc., of at least one of the turbochargers can be adjusted responsive to an indication of temperature provided by the exhaust gas sensors to reduce turbocharger imbalance and/or compressor surge.

BRIEF DESCRIPTION OF THE FIGURES

FIG. 5 is a diagram summarizing how the responsiveness of the wastegates may be diagnosed based on a comparison of exhaust gas temperature for a given command.

DETAILED DESCRIPTION

Figure 1:
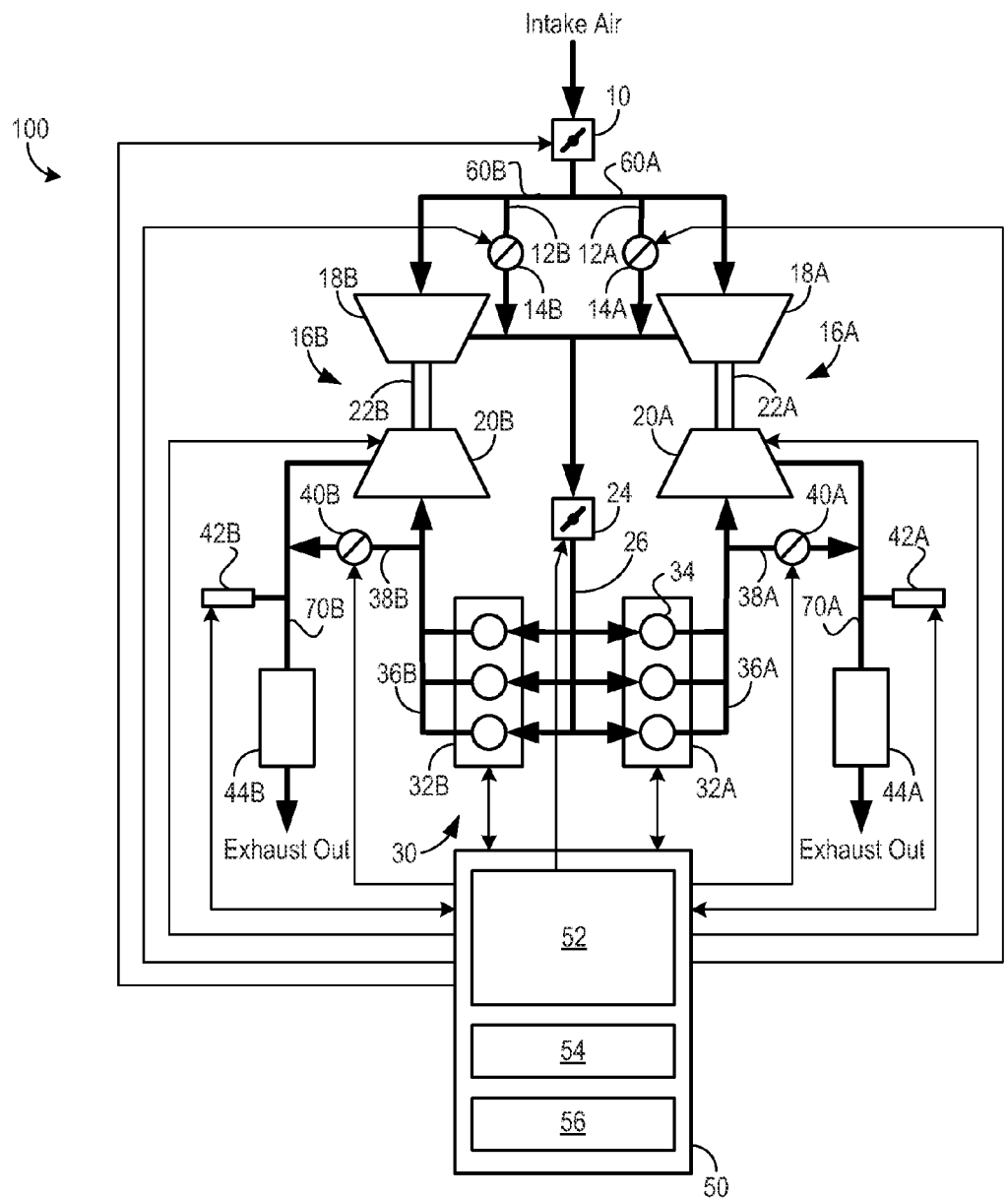
FIG. 1 shows a schematic depiction of an example engine system including twin turbochargers.

FIG. 1 shows a schematic depiction of an example engine system 100 including twin turbochargers 16A and 16B. In this example, internal combustion engine 30 includes a first cylinder bank 32A and a second cylinder bank 32B. Each of cylinder banks 32A and 32B can include a plurality of engine cylinders or combustion chambers 34. As one example, engine 30 may be configured in what may be referred to as a vee configuration whereby 3 or 4 cylinders are provided for each of cylinder banks 32A and 32B. It should be appreciated that engine 30 may include any suitable number of cylinders or cylinder configuration.

Engine 30 can receive intake air via an air intake system including a first air intake branch 60A and a second intake branch 60B. The first air intake branch 60A provides intake air to a compression device or compressor 18A of a first turbocharger 16A. Turbocharger 16A further includes an exhaust gas turbine 20A coupled to compressor 18A via shaft 22A. As one example, turbine 20A can be arranged in a first exhaust branch 70A of the engine exhaust system. Turbine 20A can provide work to compressor 18A via shaft 22A by absorbing energy from the exhaust gases flowing through exhaust branch 70A.

Similarly, the second air intake branch 60B includes a second turbocharger 16B comprising a compressor 18B and an exhaust gas turbine 20B coupled to compressor 18B via shaft 22B. Turbine 20B can be arranged in a second exhaust branch 70B of the engine exhaust system. Turbine 20B can provide work to compressor 18B via shaft 22B from energy absorbed from the exhaust stream of exhaust branch 70B.

Intake air from each of intake branches 60A and 60B may be provided to engine 30 via a common intake manifold 26. In some examples, a throttle 24 may be provided in a combined flow region of the first and second intake branches upstream of the common intake manifold. Additionally or alternatively, a throttle 10 may be provided in a combined flow region of the intake system upstream of intake branches 60A and 60B. Intake air may be provided to individual cylinders of cylinder banks 32A and 32B via respective intake valves. For example, each of the engine cylinders can include one or more intake valves controlled by cam actuation or electromagnetic valve actuation (EVA). Furthermore, exhaust gases produced by individual cylinders of cylinder banks 32A and 32B may be provided to exhaust branches 70A and 70B via their respective exhaust valves. Each of the engine cylinders can include one or more exhaust valves controlled by cam actuation or EVA. With cam actuation, the opening and closing timing of the intake and exhaust valves as well as the valve lift can be controlled by control system 50 via one or more of a variable cam timing device, variable valve lift device, and cam profile switching. With EVA, control system 50 can vary the timing and pulse width of the valve actuation signals provided to the EVA associated with the intake and exhaust valves to control the opening and closing timing and valve lift as will be appreciated by one skilled in the art in light of the present disclosure.

In some examples, one or more compressor bypass passages and/or compressor bypass valves may be provided. As shown in FIG. 1, a first compressor bypass passage 12A and compressor bypass valve 14A may be provided for enabling intake air to bypass compressor 18A. Similarly, a second compressor bypass passage 12B and compressor bypass valve 14B may be provided for enabling intake air to bypass compressor 18B. In this way, the amount of air flowing through compressors 18A and 18B may be individually controlled by varying the amount of bypass air via valves 14A and 14B, respectively. In other examples, a single compressor bypass passage and associated bypass valve (e.g. surge valve) may be provided to enable the intake air to bypass both compressors via a common bypass passage. The position of bypass valves 14A and 14B may be individually controlled via control system 50 to vary the flow rate of intake air through passages compressors 18A and 18B, respectively.

Furthermore, exhaust turbine bypass passages and/or turbine bypass valves may be provided. These turbine bypass valves will be described herein as wastegates so that they may be more easily distinguished from the compressor bypass valves described above. As shown in FIG. 1, a first wastegate 40A may be provided along passage turbine bypass passage 38A for enabling exhaust gases to bypass turbine 20A. Similarly, a second wastegate 40B may be provided along passage 38B for enabling exhaust gases to bypass turbine 20B. In this way, the amount of exhaust gases flowing through turbines 20A and 20B may be individually controlled by varying the amount of exhaust gases flowing through wastegates 40A and 40B, respectively. Note that in some examples, these wastegates may be omitted, whereby the turbochargers may be controlled by varying the geometry of their respective variable geometry turbines and/or controlling their compressor bypasses.

Each of exhaust branches 70A and 70B can include one or more exhaust gas oxygen (EGO) sensors and/or exhaust aftertreatment devices. For example, exhaust branch 70A is shown in FIG. 1 including an exhaust gas oxygen (EGO) sensor 42A arranged downstream of turbine 20A and upstream of a catalyst 44A. Similarly, exhaust branch 70B is shown including an exhaust gas oxygen (EGO) sensor 42B arranged downstream of turbine 20B and upstream of catalyst 44B. As one example, EGO sensors 42A and 42B are configured as universal exhaust gas oxygen (UEGO) sensors or heated exhaust gas oxygen (HEGO) sensors.

EGO sensors 42A and 42B can be operated by control system 50 to provide an indication of a concentration of oxygen in the exhaust gases produced by each bank of the engine. In this way, EGO sensors 42A and 42B can be configured to provide an indication of air/fuel ratio of the exhaust gases to enable feedback control of fuel injection for engine 30. Furthermore, as will be described herein, EGO sensors 42A and 42B can be operated by control system 50 to provide an indication of exhaust gas temperature in each of branches 70A and 70B, respectively. Thus, EGO sensors 42A and 42B can be operated as a multipurpose sensor for identifying exhaust gas composition and exhaust gas temperature. In this way, a separate temperature sensor may be eliminated from each branch of the exhaust system, thereby reducing cost and complexity of the engine system. However, in some examples, a separate dedicated temperature sensor may be provided in each of exhaust branches 70A and 70B downstream of their respective turbines and upstream of their respective aftertreatment devices.

A control system 50 can be provided for controlling the operation of engine system 100. While not shown in FIG. 1, control system 50 can include one or more electronic controllers each including one or more of an input/output device 52 for receiving signals from various sensors and transmitting control signals to various actuators of the engine system, a central processing unit (CPU) 54 for providing the various control operations described herein, memory 56 including random access memory (RAM), read only memory (ROM), and/or keep alive memory (KAM) each communicating via a data bus, for example.

Control system 50 can control the position of valves 14A and 14B, wastegates 40A and 40B, and throttles 10 and 24 via their respective actuators. Furthermore, in some examples, the geometry of the turbines may be varied by a variable geometry turbine (VGT) actuator to increase or decrease the amount of exhaust energy converted to work by the turbine. Thus, the control system can control turbine speed by varying the geometry of the turbine impeller.

Note that at least some of these actuators may be configured to provide feedback to control system 50 indicative of the position of the actuator. However, as described herein, an approach is provided for identifying the position of wastegates 40A and 40B responsive to an issued command without requiring the use of actuator position feedback, although such feedback may be used in addition. Thus, in at least some examples, the actuators associated with wastegates 40A and 40B are not configured to provide position feedback. Alternatively, where position feedback is available for wastegates 40A and 40B, the approaches described herein for inferring the position of the wastegates responsive to an issued command may be used to identify errors or degradation associated with the actuator position feedback sensors.

Further still, control system 50 can individually control the operating parameters of each cylinder of engine 30 including spark timing, fuel injection timing, fuel injection amount, intake valve timing, exhaust valve timing, etc. as will be described in greater detail with reference to FIG. 6.

Where EGO sensors 42A and 42B are configured as heated EGO sensors, control system 50 can control the amount of heating provided to each of the sensors by varying the duty cycles and/or magnitude of the current, voltage, or electrical power applied to the sensors. For example, control system 50 can identify the temperature of the exhaust streams flowing through exhaust branches 70A and 70B by referencing the heater duty cycle and/or magnitude of heating provided to EGO sensors 42A and 42B. Alternatively, the control system can provide a voltage and/or current to each of EGO sensors 42A and 42B to identify a resistance across their respective heater elements, whereby the resistance identified by the control system may be indicative of the temperature of the EGO sensor and hence the temperature of the exhaust gases flowing through their respective exhaust branches. Still other approaches for identifying exhaust gas temperature via an EGO sensor may be utilized alternatively or additionally by the control system.

Figure 2:
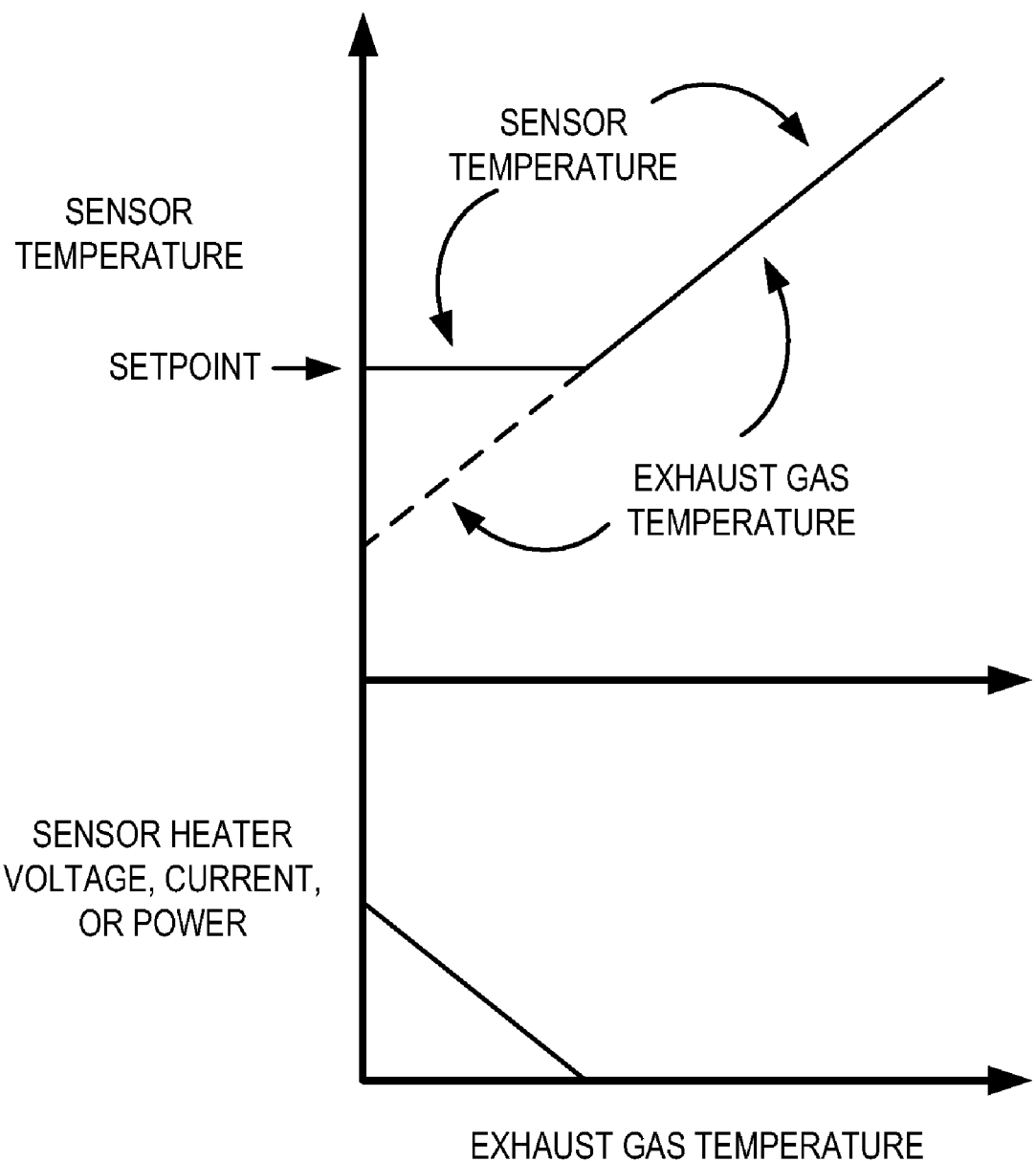
FIG. 2 shows a graph describing a relationship between sensor temperature and exhaust gas temperature.
Figure 3:
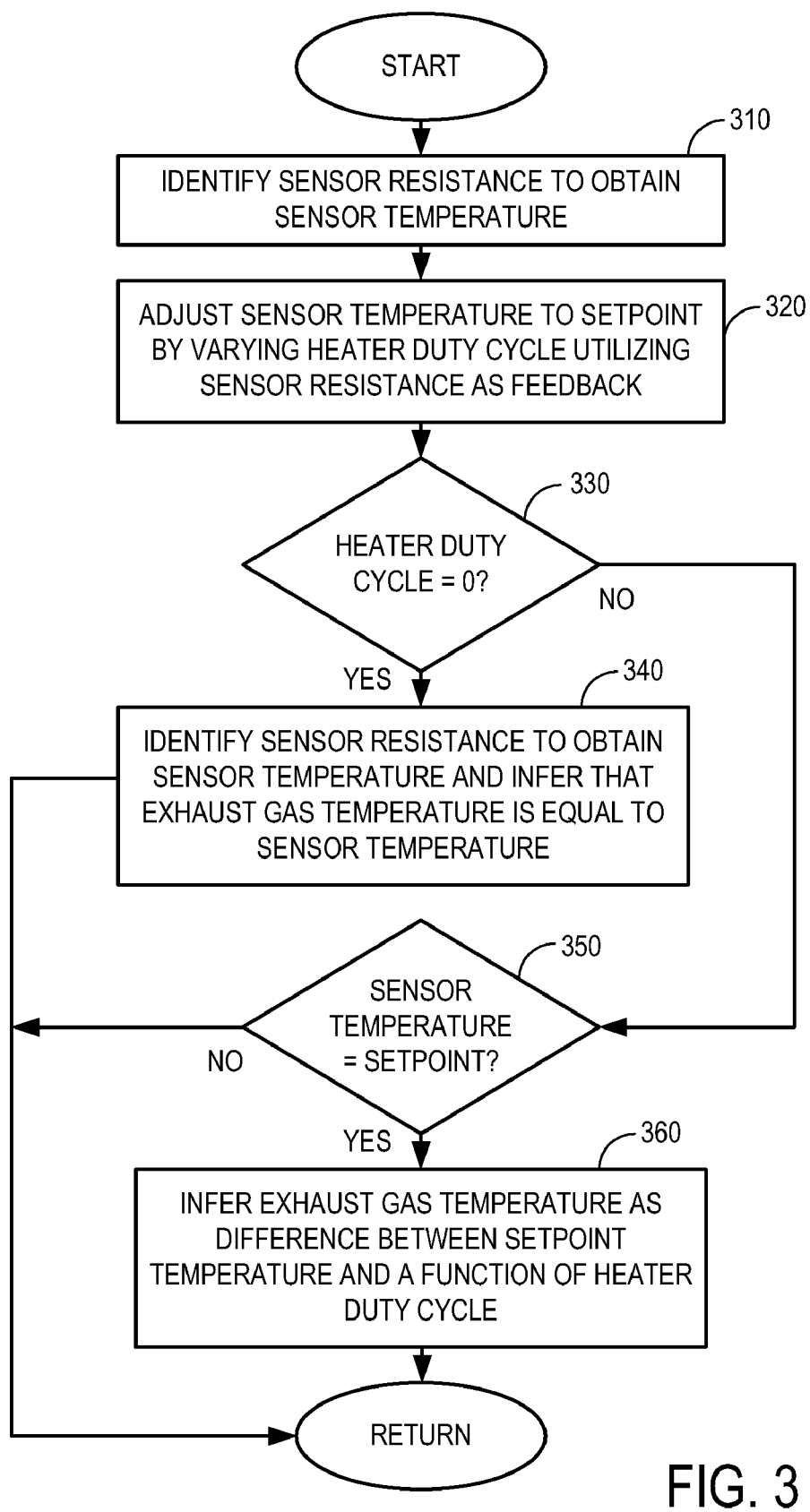
FIG. 3 is a flowchart depicting an example control strategy for inferring an exhaust gas temperature via an exhaust gas sensor.

Referring now to FIGS. 2 and 3, an example approach for identifying exhaust gas temperature via an EGO sensor is described. Some EGO sensors control sensor substrate temperature to a constant minimum temperature via feedback. An exhaust gas temperature inference can be made by using a combination of the exhaust gas sensor's substrate resistance, the heater power, and the exhaust flow rate. Alternative approaches may also be used for obtaining an indication of exhaust temperature from a EGO, UEGO, HEGO, or other type of air-fuel ratio sensor. For example, electrical resistance of the sensor when it is not being utilized for purposes of air-fuel control can be correlated to exhaust gas temperature.

FIG. 2 shows a graph depicting a relationship between sensor temperature and exhaust gas temperature for a heated EGO sensor that is controlled to a sensor temperature setpoint. As shown by the graph of FIG. 2, in the case where the exhaust gas temperature exceeds the sensor's temperature setpoint, the sensor temperature nearly coincides with the exhaust gas temperature. In the case where the sensor's temperature setpoint exceeds the exhaust gas temperature, the heater's power, current, voltage, and/or duty cycle increases with the temperature difference between the setpoint and the exhaust gas temperature.

FIG. 3 shows a flow chart depicting one example approach that may be used to infer exhaust gas temperature. As indicated at 310, the sensor resistance can be identified by the control system (e.g. controller 50). As one example, the resistance may be measured by the controller by applying a known current through the sensor substrate and recording the voltage that develops. The resistance of the sensor can be correlated with an inferred sensor temperature, since the resistance of the sensor varies with the sensor temperature. At 320, the sensor temperature can be controlled to the setpoint by varying the heater duty cycle utilizing the sensor resistance as feedback. In the case where the sensor temperature exceeds the setpoint, the sensor's heater duty cycle goes to zero. Thus, if the controller judges at 330 that the heater duty cycle=0, then it may be inferred at 340 that the exhaust gas temperature is equal to the temperature of the sensor, which in turn is based on the sensor resistance identified by the controller. In the case where the sensor temperature equals the setpoint, the sensor's heater duty cycle monotonically increases with the difference between the sensor temperature and the exhaust temperature. Thus, where it is judged at 350 that the sensor temperature is equal to the setpoint, it can be inferred at 360 that the exhaust gas temperature is equal to the difference between the setpoint temperature and a function of the sensor's heater duty cycle. As one example, the function of the heater's duty cycle may be equal to the product of the sensor's heater duty cycle and a gain term. Additionally, a factor may be added to the sensor's heater duty cycle to account for exhaust gas flow rate as obtained by an airflow sensor or as inferred by the control system. Alternatively, a look-up table stored in memory at the controller can be used to infer exhaust gas temperature from the difference between the setpoint temperature and the function of the heater duty cycle.

Figure 4:
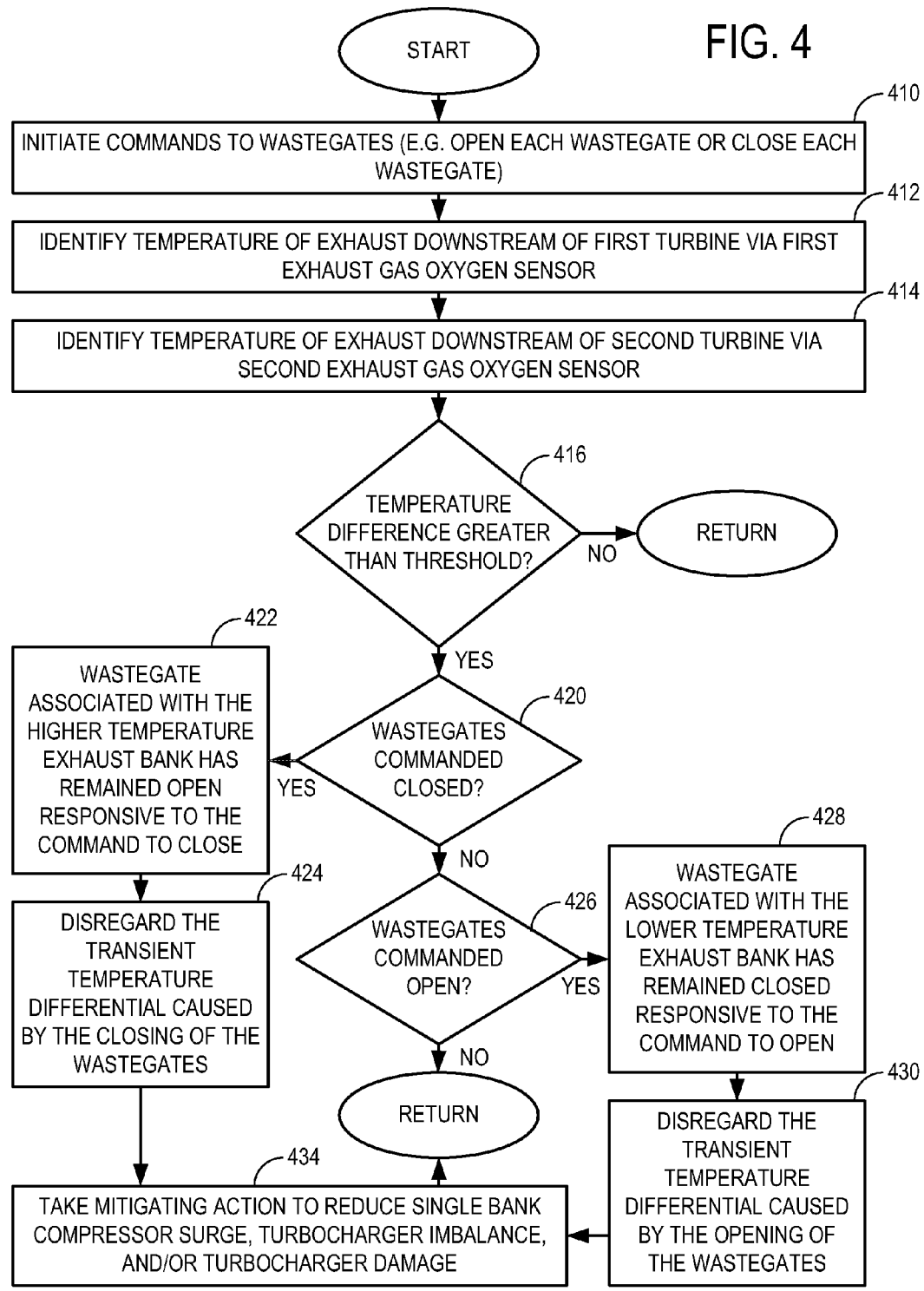
FIG. 4 is a flow chart depicting an example control strategy for identifying which of two wastegates is unresponsive to a command signal based on a comparison of exhaust gas temperature.

FIG. 4 is a flow chart depicting an example control strategy for identifying which of two wastegates is unresponsive to an issued command signal based upon a comparison of exhaust gas temperature downstream of the turbines. At 410, a command to open or close the wastegates is issued. As one example, the control system can command each of the wastegates to open or close. In this particular example, the control system issues a command to each of the wastegates to attain the same open or closed position. Note that these commands may be issued concurrently or at different times. However, it should be appreciated that concurrent commands can reduce turbocharger imbalance under some conditions.

At 412, the temperature of the exhaust gases flowing through the first exhaust branch downstream of the first turbine may be identified via a first EGO sensor. For example, EGO sensor 42A can be operated to provide an indication to control system 50 of the temperature of the exhaust gases flowing through exhaust branch 70A from either of turbine 20A and/or wastegate 40A.

As one non-limiting example, exhaust gas temperature can be identified from a combination of EGO sensor substrate resistance, its heater power (amount of power provided to the EGO heater), and the exhaust flow rate through the EGO sensor's exhaust system branch as described with reference to FIGS. 2 and 3.

At 414, the temperature of the exhaust gases flowing through the second exhaust branch downstream of the second turbine may be identified via a second EGO sensor. For example, EGO sensor 42B can be operated to provide an indication to control system 50 of the temperature of the exhaust gases flowing through exhaust branch 70B from either of turbine 20B and/or wastegate 40B. The approach used for identifying temperature of the second exhaust stream via EGO sensor 42B can be the same as that used to identify the temperature of the first exhaust stream via EGO sensor 42A as described above.

At 416, if a difference between the temperature of the first exhaust stream identified at 412 and the temperature of the second exhaust stream identified at 414 is greater than a prescribed threshold, then the routine may proceed to 420. For example, the control system can compare the temperature difference between the exhaust streams obtained from the EGO sensors to a prescribed temperature difference threshold value. As one non-limiting example, a temperature threshold difference may include a value of 150 degrees Fahrenheit. However, other suitable temperature thresholds that are lower or higher than 150 degrees Fahrenheit may be used. Furthermore, in some examples, the control system may vary the temperature difference threshold responsive to operating conditions of the engine system. For example, the threshold may be made higher or lower at different engine speeds, engine loads, turbocharging conditions, etc. For example, as the load increases, the temperature difference threshold may be increased, and vice versa. If the temperature difference between the exhaust streams is not greater than the threshold temperature difference, the routine may return to 410, whereby the exhaust gases flowing downstream of the turbine outlets may be continually or periodically monitored by the control system via the EGO sensors. For example, the control system can vary the operation of EGO sensors between a temperature measuring operation and an exhaust composition monitoring operation.

At 420, if the wastegates were commanded closed at 410 (i.e. to reduce the flow of exhaust gases bypassing the turbine thereby increasing the flow of exhaust gases through the turbine), the routine may proceed to 422. Otherwise, if at 426, the wastegates were instead commanded open at 410 (i.e. to increase the flow of exhaust gases bypassing the turbine thereby reducing the flow of exhaust gases through the turbine), the routine may proceed to 428. Otherwise, the routine may return to 410 for subsequent monitoring of the exhaust gas temperature via the EGO sensors.

At 422, it may be judged that the wastegate associated with the exhaust passage having the higher temperature exhaust gases (e.g. as detected by the EGO sensor) has remained open responsive to the command for the wastegates to close. For example, the control system can infer that the wastegate of the higher temperature exhaust flow has remained open since a reduction in exhaust gas temperature has not occurred. If the wastegate of the higher temperature branch had closed as commanded, the increased flow rate of exhaust gases through the turbine would have resulted in a greater temperature reduction (e.g. as exhibited by the lower temperature exhaust flow of the other exhaust branch) since the turbine causes a greater temperature drop as it converts a greater quantity of exhaust gas energy to mechanical work. In this way, the control system can infer that the wastegate of higher temperature exhaust branch has not responded sufficiently to the command to close and has therefore remained in the opened position or a more open position than the other wastegate.

At 424, the control system may disregard some transient temperature differentials, which may be caused by the commanded closing of the wastegates. For example, the control system may disregard an apparent temperature difference obtained within a specified period after the command was issued to the wastegates in order to negate variations in exhaust temperature that may be caused by differences in the wastegate response times. For example, the control system may infer an unresponsive wastegate and/or take corrective action based on the unresponsive wastegate only after a specified period of time has elapsed after sending the wastegate command signal. However, in some examples, the operation at 424 may be omitted.

Referring to 428, it may be judged that the wastegate associated with the exhaust passage having the lower temperature exhaust gases has remained closed responsive to the command for the wastegates to open. For example, the control system can infer that the wastegate of the lower temperature exhaust flow has remained closed since an increase in exhaust gas temperature has not occurred. If the wastegate of the lower temperature branch had opened as commanded, the reduced flow rate of exhaust gases through the turbine would have provided a greater temperature increase (e.g. as exhibited by the higher temperature exhaust flow of the other exhaust branch) as the turbine converts less of the exhaust gas energy to mechanical work. In this way, the control system can infer that the wastegate of the lower temperature exhaust branch has not responded to the command to open and has therefore remained in the closed position or is less open than the other wastegate.

At 430, the control system may disregard transient temperature differentials caused by the commanded opening of the wastegates. For example, the control system may disregard the temperature difference obtained within a specified period after the command was issued to the wastegates in order to negate variations in exhaust temperature that may be caused by differences in the wastegate response times. For example, the control system may infer an unresponsive wastegate or take corrective action based on the unresponsive wastegate only after a specified period of time has elapsed after sending the wastegate command signal. Note that this transient period can be different for a wastegate opening command than for a wastegate closing command. For example, the decision to disregard the transient temperature differential may differ between the operations at 424 and 430 as the control system may utilize different criteria for judging whether the temperature differential was caused by the transient operation of the wastegates or whether an unresponsive wastegate condition exists. For example, the transient period for the wastegates closing may be greater or less than the transient period for the wastegates opening. In some examples, the operation at 430 may be omitted.

At 434, mitigating action may be taken to reduce compressor surge, turbocharger imbalance (e.g. balance of flow rate and/or speed of each of the turbochargers), and/or turbocharger degradation that may be caused by an unresponsive wastegate. For example, depending on which wastegate is unresponsive and the inferred position of the unresponsive wastegate, the control system can control one or more of the various engine system operating parameters including the various valves, wastegates, throttles, and/or other engine operating parameters to reduce compressor surge and/or turbocharger imbalance. For example, potentially degrading effects of an unresponsive wastegate may result in oscillations in the flow between each branch of the intake system, which may cause one or both of the compressors to experience surge if measures are not taken to mitigate this imbalance. Various examples of the corrective or mitigating actions that may be taken will be described in greater detail with reference to FIG. 6.

FIG. 5 provides a table summarizing how an unresponsive wastegate and position of the unresponsive wastegate may be identified based on a temperature difference between the exhaust flows of the separate branches of the exhaust system.

The wastegate commands are provided along the vertical axis of the table and the resulting exhaust temperature conditions downstream of the turbine outlets are provided along the horizontal axis of the table.

For example, if the wastegates are commanded open (e.g. exhaust gases bypassing the turbines are to be increased), then it may be inferred that the lower temperature exhaust stream includes a wastegate that has remained closed and is therefore unresponsive to the command to open. Furthermore, it can be inferred that the wastegate associated with the higher temperature exhaust stream has opened responsive to the command to open. On the other hand, if the wastegates are instead commanded to close, it can be inferred that the wastegate associated with the lower temperature exhaust stream has closed and the wastegate associated with the higher temperature exhaust stream is unresponsive to the command and has remained open. In some examples, the control system may include a look-up table or map stored in memory for identifying which of the two wastegates is unresponsive to a given command based on the resulting exhaust stream temperatures identified downstream of the turbines.

Once the control system identifies which of the wastegates is unresponsive to the command and the relative positions of the wastegates, the control system can take mitigating action as indicated at 434 to reduce turbocharger imbalance and/or compressor surge, thereby reducing turbocharger degradation. As one non-limiting example, the control system may seek to reduce the boost provided to the engine by one or both of the turbocharger compressors. For example, as described with reference to FIG. 6, an operating parameter of the turbocharger associated with the lower temperature exhaust stream may be adjusted to reduce a level of boost provided to the engine. This operation may be performed by adjusting the responsive wastegate to the position of the unresponsive wastegate, adjusting turbine geometry via a VGT actuator, and/or varying the amount of compressor bypass, etc.

Figure 6:
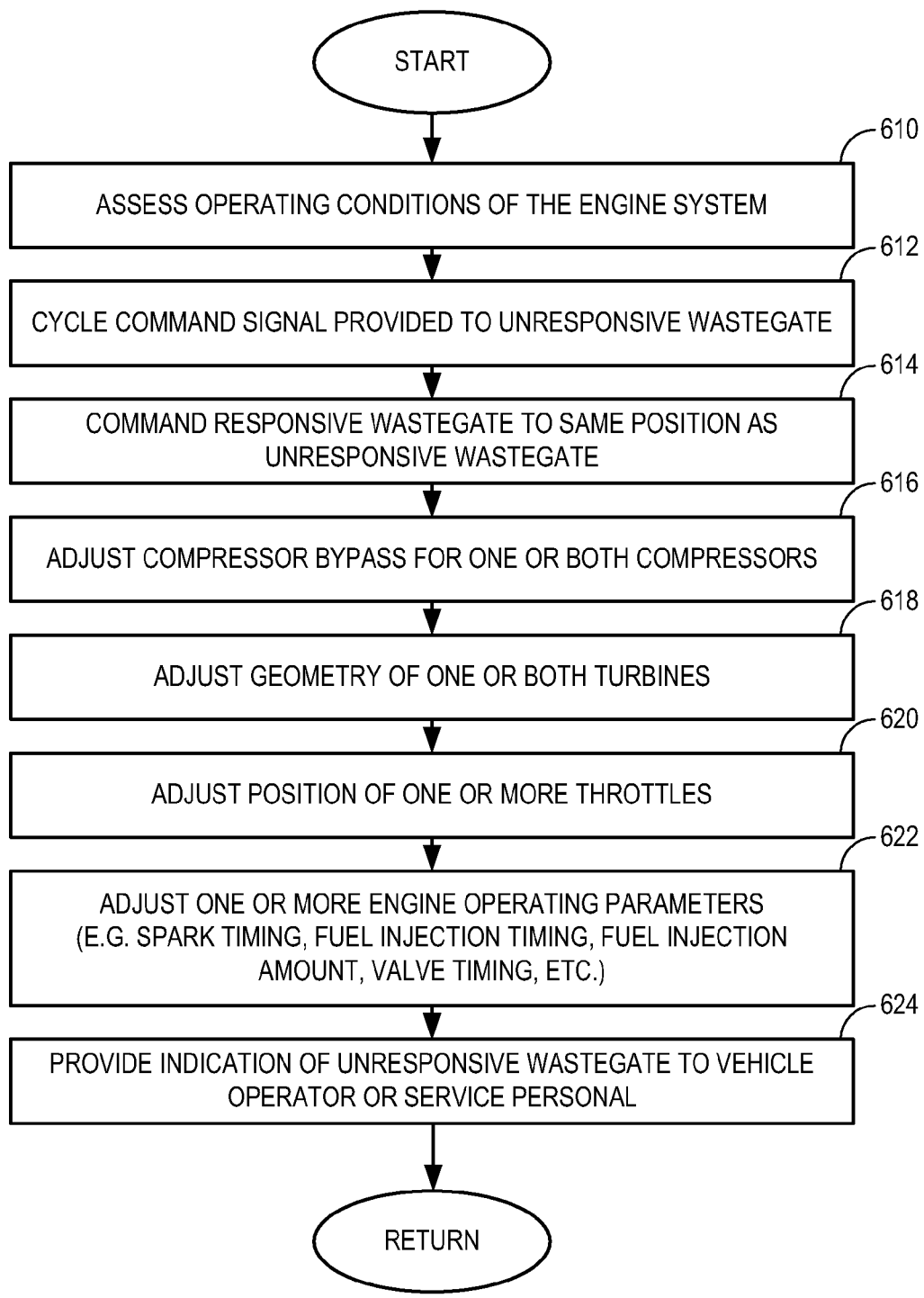
FIG. 6 is a flow chart depicting an example control strategy for adjusting one or more operating parameters of the engine system based on an indication that one of the wastegates is unresponsive.

Referring now to FIG. 6, a flow chart describing a variety of mitigating actions that may be performed for reducing turbocharger imbalance and/or compressor surge are provided. As one example, the routine described with reference to FIG. 6 may be utilized by the control system when mitigating action is requested at 434.

Beginning at 610, the operating conditions of the engine system may be assessed. For example, the control system may identify magnitude of the temperature difference between the separate exhaust streams and the current position and control limits of the various actuators associated with the engine system valves, throttles, wastegates, etc., among other operating conditions. Next, one or more of operations 612-624 may be performed to adjust an operating parameter of the engine system or turbochargers to mitigate the effects of the unresponsive wastegate. Note that the decision to perform one or more of the various operations described with reference to 612-624 can be based upon whether an actuator associated with a particular operation has attained its control limit and/or whether the control operation was successful at reducing compressor surge and/or turbocharger imbalance. For example, where the geometry of a first turbine is adjusted as described at 618 to the full extent of its control range to reduce turbocharger imbalance, the control system may seek to utilize one or more of the other control operations described by FIG. 6.

At 612, the command signal provided to the unresponsive wastegate may be cycled in an attempt to free the wastegate from its unresponsive position. For example, if the wastegate was unresponsive to a command to open, the control system may be instead commanded to close and then subsequently commanded to open. The control system can attempt to free the wastegate from its unresponsive state by periodically cycling the command signal between open and close commands. Thus, an operating parameter of the turbocharger including the unresponsive wastegate may be adjusted to reduce the turbocharger imbalance.

At 614, the responsive wastegate may be commanded to the same position as the unresponsive wastegate, thereby reducing imbalance in the exhaust flows. For example, the control system may command a closed wastegate to an opened position if the other wastegate was unresponsive to a previous close command. In this way, the difference in the flow rate of exhaust gases through the turbines can be reduced by adjusting an operating parameter of the turbocharger, thereby reducing flow imbalance that may cause compressor surge. It should be appreciated that in some conditions, commanding both wastegates to an open position may provide greater protection to the turbochargers, since turbocharger speed can be reduced by increasing the amount of exhaust gases that are bypassing the turbines.

At 616, one or both of the compressor bypasses may be adjusted to reduce the flow imbalance and/or to reduce the overall level of boost provided by each of the turbochargers. For example, where the compressors each include an independently controllable compressor bypass, then the control system can adjust one or both of the compressor bypasses relative to the other to reduce flow imbalance between the turbochargers, and hence reduce turbocharger imbalance and/or compressor surge. Alternatively, where only a combined bypass is provided for both of the compressors, the control system may open the bypass to reduce the flow of intake air through both of the compressors, thereby reducing the total boost provided by each of the turbochargers. However, in some examples, the control system may instead increase the flow of intake air through one or both of the compressors to reduce compressor surge by closing one or both of the compressor bypass valves, depending on the operating state of the turbochargers. Thus, an operating parameter of at least one turbocharger, such as the compressor bypass, may be adjusted.

At 618, where the turbines are configured as variable geometry turbines (VGT), the geometry of one or both of the turbines may be adjusted by the control system via their respective actuators to reduce the flow imbalance between the turbochargers and/or reduce the level of boost provided by each of the turbochargers. For example, where a wastegate associated with a first turbocharger is stuck in a closed position (e.g. unresponsive to an open command), thereby maintaining the flow of exhaust gases through the first turbocharger, the geometry of the first turbocharger may be adjusted to reduce the conversion of exhaust gas energy to work. In this way, the speed increase of the compressor associated with the first turbine may be reduced by adjusting an operating parameter of the turbocharger. However, in other examples, the speed of one or both of the compressors may be increased to reduce surge, depending on the particular operating conditions.

At 620, the position of one or more throttles may be adjusted to reduce flow imbalance between the turbochargers and/or reduce the level of boost provided by the turbochargers. For example, the control system can reduce the throttle opening to reduce the level of boost provided to the engine. However, in some conditions, the control system may increase the throttle openings to increase airflow through the compressors, which may reduce compressor surge in some conditions. Further still, the control system may reduce the opening of a first throttle and increase the opening of a second throttle. For example, throttle 10 located on the upstream side of the compressors may be adjusted relative to throttle 24 located on the downstream side of the compressors.

At 622, one or more engine operating parameters may be adjusted to reduce flow imbalance and/or to reduce the amount of exhaust energy provided to one or both of the turbochargers. For example, the control system can adjust one or more operating parameters of individual cylinders of the engine including spark timing, fuel injection amount, fuel injection timing, intake valve timing, exhaust valve timing, etc. As a non-limiting example, where a wastegate of a first exhaust branch is unresponsive to a command to open (e.g. is stuck closed) the control system can reduce the amount of heat provided to the first exhaust branch in order to reduce turbine speed-up. For example, the amount of heat provided to the first exhaust branch may be reduced by adjusting one or more operating parameters of the cylinders associated with the first branch, including reducing spark retard from optimal timing, advancing fuel injection, varying fuel injection amount, and/or adjusting exhaust valve timing, among others. As another non-limiting example, the engine can be shut-off or deactivated by discontinuing fueling and ignition within the engine if turbocharger imbalance is substantial.

At 624, an indication of the unresponsive wastegate can be provided to the vehicle operator or vehicle service personnel. For example, the control system can turn on an indicator light on the vehicle dashboard or console that is indicative of an engine system malfunction (e.g. stuck wastegate) and/or can provide an error message or code to the vehicle service personnel indicating which of the wastegates has malfunctioned. Further, the code may be transmitted to a central data management system and may be e-mailed to the vehicle operator In some examples, the control system can store the error message or code in memory, which can be used to limit future operation of the engine system and can be read by service personnel for later diagnosis. Finally, the routine can return where other mitigating actions can be performed as necessary to further reduce turbocharger imbalance.

Figure 7:
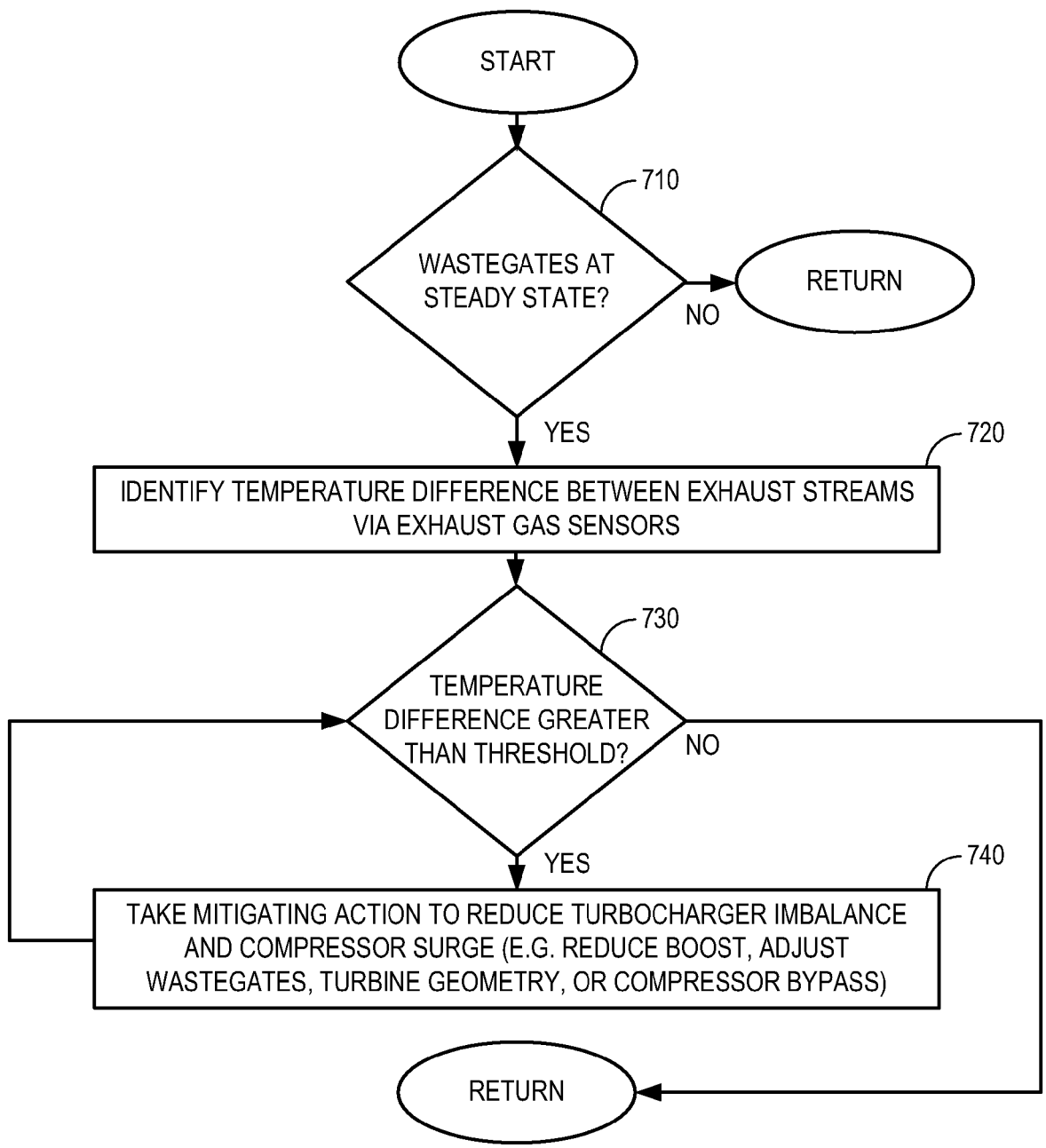
FIG. 7 is a flow chart depicting an example control strategy for reducing turbocharger imbalance and compressor surge when the wastegates are functioning properly.

While the previously described approaches can be applied to conditions where an imbalance between the turbochargers is initiated by an inoperative or unresponsive wastegate, it should be appreciated that the exhaust gas sensors can also be used to identify turbocharger imbalance via the exhaust gas sensors and take corrective action even when both wastegates are functioning properly. Referring to FIG. 7, a flow chart is describing an example turbocharger control approach is provided. Beginning at 710, it can be judged whether the wastegates are at steady state. In other words, the control system can judge whether the wastegates have recently been commanded to open and close. As one example, the control system may judge that the wastegates are at steady state when they have not been operated for a threshold period of time.

If the answer at 710 is no, the routine can return, whereby the routine of FIG. 4 may be used to identify whether an imbalance between the turbochargers has occurred as a result of an unresponsive wastegate. Alternatively, if the answer at 710 is yes, then the routine can proceed to 720. At 720, the temperature difference between the exhaust streams downstream of the turbines can be identified via the exhaust gas sensors. At 730, it may be judged whether the temperature difference between the exhaust streams is greater than a threshold. As the flow provided by the turbochargers becomes unbalanced and one of the compressors enters surge, its respective turbine can unload causing a drop in temperature of the exhaust stream in the case where both of the wastegates are set to the closed position. Note that this threshold can be the same or different than the temperature threshold described with reference to 416. As one example, the temperature threshold at 730 may be less than the threshold temperature difference utilized at 416, since a mere imbalance in turbocharger loads is detected by the routine of FIG. 7 rather than an unresponsive wastegate as detected by the routine of FIG. 4.

If the answer at 730 is no, the routine can return. Alternatively, if the answer at 730 is yes, the control system can take mitigating action at 740 to reduce turbocharger imbalance and compressor surge by adjusting one or more operating parameters of the turbochargers. As one example, the control system may reduce the level of boost provided by each of the turbochargers by adjusting one or more of the wastegates, turbine geometries, or compressor bypasses. In contrast to the approach of FIG. 5 for a single unresponsive wastegate, the various turbocharger operating parameters may be adjusted in a more symmetric manner between the twin turbochargers since adjustment of the operating parameters of only a single turbocharger can cause an oscillating imbalance to occur, whereby the compressors take turns entering surge and recovering from surge. From the actions taken at 740, the routine may return to 730 to judge whether the temperature difference is still greater than the prescribed threshold. In this way, the control system can respond to turbocharger imbalance that may occur even when the wastegates are functioning properly.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine system including an engine having a first cylinder bank and a second cylinder bank operatively coupled to at least two turbochargers via a common intake manifold, the method comprising:
   during a first mode, varying an amount of fuel that is provided to the first cylinder bank responsive to feedback provided by a first exhaust gas sensor arranged along an exhaust passage of the first cylinder bank and varying an amount of fuel that is provided to the second cylinder bank responsive to feedback provided by a second exhaust gas sensor arranged along an exhaust passage of the second cylinder bank; and
   during a second mode, the second mode being different from the first mode, adjusting an operating parameter of at least one of the turbochargers responsive to a comparison of a first temperature indication provided by the first exhaust gas sensor and a second temperature indication provided by the second exhaust gas sensor.

2. The method of claim 1, further comprising, issuing a command to vary a position of a first wastegate of the first turbocharger and a second wastegate of the second turbocharger; and wherein said first and second temperature indications are provided during the second mode after said command is issued.

3. The method of claim 1, further comprising, providing an indication of a degraded wastegate based on said comparison of the first and second temperature indications.

4. The method of claim 3, wherein the indication of a degraded wastegate includes at least one of turning on an indicator light on a console for a vehicle operator or storing an error code in memory at an electronic controller for subsequent detection by service personnel.

5. The method of claim 1, wherein the operating parameter includes a geometry of a variable geometry turbine.

6. The method of claim 1, wherein the comparison of first and second temperature indications is performed after a first wastegate of the first turbocharger and a second wastegate of the second turbocharger are each commanded to move to an opened position or a closed position; and wherein the operating parameter includes a level of boost provided by one of the first and second turbochargers.

7. The method of claim 1, wherein the comparison of a first and second temperature indications is performed after a first wastegate of the first turbocharger and a second wastegate of the second turbocharger are each commanded to move to an opened position or a closed position to vary flow of exhaust gases through their respective turbines; and wherein the operating parameter that is adjusted includes a position of one of the wastegates.

8. An electronic engine controller for a twin turbocharged engine having two independent exhaust streams, each exhaust stream including a wastegate for varying a portion of the exhaust stream that flows through a turbine of a twin turbocharger, the controller including non-transitory memory including executable instructions stored thereon, comprising:
   instructions executable to issue a common command to each of the wastegates directing the wastegates to move to either a closed position that increases the portion of the exhaust streams that flows through the turbines or an opened position that reduces the portion of the exhaust streams that flows through the turbines; and
   instructions executable to identify a temperature difference between the exhaust streams at a location downstream of the wastegates after said command was issued and adjust an operating parameter of the turbocharger associated with a lower temperature exhaust stream to reduce said temperature difference by reducing a level of boost provided to the engine, the temperature difference being obtained from a comparison of outputs indicative of exhaust stream temperature from exhaust gas sensors arranged in each exhaust stream downstream of their respective wastegate and turbine.

9. An engine system for a vehicle, comprising:
   an internal combustion engine including an air intake system and an exhaust system;
   a first turbocharger including a first compressor arranged along a first branch of the air intake system, a first turbine arranged along a first branch of the exhaust system, and a first turbine bypass passage including a first wastegate;
   a second turbocharger including a second compressor arranged along a second branch of the air intake system, a second turbine arranged along a second branch of the exhaust system, and a second turbine bypass passage including a second wastegate;
   a first exhaust gas sensor arranged along the first branch of the exhaust system downstream of the first turbine and first wastegate, the first exhaust gas sensor configured to indicate an exhaust temperature in the first branch of the exhaust system;
   a second exhaust gas sensor arranged along the second branch of the exhaust system downstream of the second turbine and the second wastegate, the second exhaust gas sensor configured to indicate an exhaust gas temperature in the second branch of the exhaust system; and
   a control system coupled to the first and second wastegates and the first and second exhaust gas sensors, the control system including non-transitory memory including instructions stored thereon executable by a central processing unit to command both the first wastegate and the second wastegate to a closed position or an opened position and to indicate one of said wastegates as unresponsive to said command in response to a temperature difference between the first and second branches indicated by the first and second exhaust gas sensors, wherein the control system is configured to indicate one of said wastegates as unresponsive to said command when said temperature difference is greater than a temperature difference threshold and wherein the control system is configured to not indicate one of said wastegates as unresponsive to said command when the temperature difference is less than the temperature difference threshold; and wherein the indication is provided by the first and second exhaust gas sensors while the wastegates are commanded to the closed or opened position.

10. The system of claim 9, wherein the closed position of the first wastegate provides a greater flow of exhaust gases through the first turbine than the opened position; and wherein the closed position of the second wastegate provides a greater flow of exhaust gases through the second turbine than the opened position.

11. The system of claim 9, wherein said indication of the unresponsive wastegate includes an indicator light displayed on a control console for a vehicle operator.

12. The system of claim 9, wherein said indication of the unresponsive wastegate includes an error code stored in memory at the control system.

13. The system of claim 9, wherein the non-transitory memory includes instructions stored thereon executable by the central processing unit to adjust an operating parameter of at least one of the first turbocharger and second turbocharger responsive to said temperature difference.

* * * * *